United States Patent
Kujala et al.

(10) Patent No.: US 9,069,364 B2
(45) Date of Patent: Jun. 30, 2015

(54) ENHANCED ON-TIME GENERATOR

(71) Applicant: Fairchild Semiconductor Corporation, San Jose, CA (US)

(72) Inventors: Juha-Matti Kujala, Kokkola (FI); Jouni Mika Kalervo Vuorinen, Oulu (FI)

(73) Assignee: Fairchild Semiconductor Corporation, San Jose, CA (US)

( * ) Notice: Subject to any disclaimer, the term of this patent is extended or adjusted under 35 U.S.C. 154(b) by 146 days.

(21) Appl. No.: 13/826,543

(22) Filed: Mar. 14, 2013

(65) Prior Publication Data

US 2013/0249524 A1   Sep. 26, 2013

Related U.S. Application Data

(60) Provisional application No. 61/614,736, filed on Mar. 23, 2012.

(51) Int. Cl.
*G05F 3/04*   (2006.01)
*G05F 3/08*   (2006.01)

(52) U.S. Cl.
CPC .................................. *G05F 3/08* (2013.01)

(58) Field of Classification Search
USPC ......... 323/234, 237, 266, 273, 282, 304, 311, 323/312, 313
See application file for complete search history.

(56) References Cited

U.S. PATENT DOCUMENTS

| | | | |
|---|---|---|---|
| 8,223,058 B2 * | 7/2012 | Kobayashi et al. | 341/172 |
| 2001/0033240 A1 * | 10/2001 | Ueno et al. | 341/143 |
| 2003/0230758 A1 * | 12/2003 | Hausmann et al. | 257/100 |
| 2006/0214651 A1 * | 9/2006 | Ke et al. | 323/311 |
| 2010/0117617 A1 * | 5/2010 | Chuang et al. | 323/285 |
| 2011/0095744 A1 * | 4/2011 | Unetich et al. | 323/311 |
| 2011/0156684 A1 * | 6/2011 | Da Silva et al. | 323/284 |

FOREIGN PATENT DOCUMENTS

| | | |
|---|---|---|
| CN | 1322062 A | 11/2001 |
| CN | 102026443 A | 4/2011 |
| CN | 102315773 A | 1/2012 |
| CN | 203206101 U | 9/2013 |

OTHER PUBLICATIONS

"Chinese Application Serial No. 201310097269.1, Office Action mailed Dec. 2, 2014", 11 pgs.

* cited by examiner

*Primary Examiner* — Jeffrey Gblende

(74) *Attorney, Agent, or Firm* — Schwegman Lundberg & Woessner, P.A.

(57) ABSTRACT

This document discusses, among other things, voltage converters and computed on-time voltage converters. In an example, an on-time generator for a voltage converter can include a timing capacitor configured to provide a timing voltage, a comparator configured to receive the timing voltage and a threshold voltage and to provide the timing signal using a comparison of the timing voltage and the threshold voltage, a current source configured to discharge the timing voltage of the timing capacitor after a start-up delay, and first and second compensation capacitors configured to bias the timing voltage of the timing capacitor to compensate for the start-up delay.

18 Claims, 3 Drawing Sheets

ENHANCED ON-TIME GENERATOR

CLAIM OF PRIORITY

This application claims the benefit of priority under 35 U.S.C. 119(e) to Kujala et al., U.S. Provisional Patent Application Ser. No. 61/614,736, entitled, "ENHANCED ON TIME DELAY GENERATOR", filed Mar. 23, 2012, hereby incorporated by reference herein in its entirety.

OVERVIEW

This document discusses, among other things, voltage converters and computed on-time voltage converters. In an example, an on-time generator for a voltage converter can include a timing capacitor configured to provide a timing voltage, a comparator configured to receive the timing voltage and a threshold voltage and to provide the timing signal using a comparison of the timing voltage and the threshold voltage, a current source configured to discharge the timing voltage of the timing capacitor after a start-up delay, and first and second compensation capacitors configured to bias the timing voltage of the timing capacitor to compensate for the start-up delay.

In certain examples, the size of the first compensation capacitor is different than the size of the second compensation capacitor. In some examples, the comparator can be configured to be disabled outside of the on-time interval and can have a start-up delay prior to comparing the timing voltage and the threshold voltage. In certain examples, the on-time generator can provide a timing signal to terminate an on-time interval of a voltage converter. In some examples, the on-time interval can be associated with a low-impedance mode of a transistor of the voltage converter a timing capacitor configured to provide a timing voltage.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Voltage converters such as buck, or boost converters, can receive a input direct current (DC) voltage and can provide at an out an output a DC voltage that differs from the input voltage. In certain examples, the output voltage can be at near the input voltage during certain intervals of operation of the voltage converter. In certain examples, a boost converter, or regulator, can provide a minimum voltage rail for applications that require higher voltages than a battery, for example, can supply.

In certain examples, the higher output voltage of a boost converter can be provided by storing energy in an inductor and releasing the stored energy to charge an output capacitor to a desired output voltage level. Energy can be stored in an inductor by initiating or increasing current through the inductor. The stored energy of the inductor current can then be released to charge the output capacitor to a desired voltage level.

Figure 1:
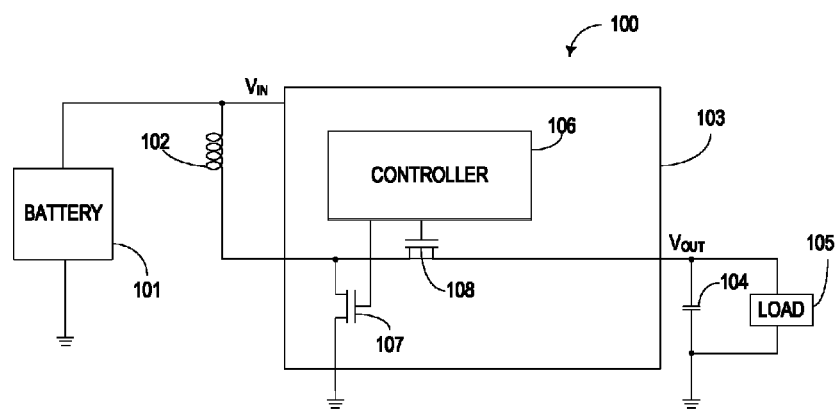
FIG. 1 illustrates generally an example boost converter system.

FIG. 1 illustrates generally an example boost converter system 100 including a battery 101, inductor 102, boost converter 103, output capacitor 104, and load 105. The boost converter 103 can include a controller 106, a first transistor 107, and a second transistor 108. In certain examples, a first terminal of the inductor 102 can be coupled to an input voltage supply, such as the battery 101. The first transistor 107 of the boost converter 103 can be controlled into a low-impedance mode to initiate or increase current through the inductor 102 by coupling a second terminal of the inductor 102 to ground during an on-time interval of the boost converter 103. In certain example, during an off-time of the boost converter 103, the second transistor 108 can couple the second terminal of the inductor 102 to an output of the boost converter 103 to, for example, charge a load capacitor 104 to a desired output voltage level. In certain examples, the boost converter output voltage ($V_{OUT}$) can be at least partially controlled by one or more pulse trains generated by the controller 106 and received by the first and second transistors 107, 108. In certain examples, a duty cycle can be associated with a pulse train. Duty cycle can refer to an ON:OFF ratio that indicates the ratio of the time duration of each pulse (an ON time) that is delivered versus the time duration between successive pulses (an OFF time). At least a portion of the pulse train for the first transistor 107 of the boost converter can be generated by an "on-time generator" of the controller 103.

Figure 2:
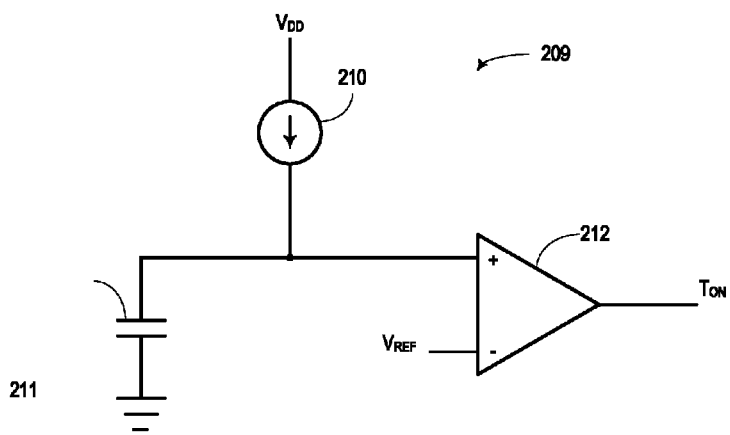
FIG. 2 illustrates an existing on-time generator.

FIG. 2 illustrates an existing on-time generator 209 including an adjustable current source 210, a timing capacitor 211 and a comparator 212. Prior to generating an on-time pulse, the timing capacitor 211 can be discharged. The comparator 212 can provide an output ($T_{ON}$) indicative of the voltage across the timing capacitor 211 compared to a threshold or reference voltage ($V_{REF}$). As an on-time interval commences, the adjustable current source 210 can charge the timing capacitor 211. Upon the voltage across the timing capacitor 211 rising to and above the reference voltage ($V_{REF}$) the output of the comparator 212 can change logic levels to indicate the end of the on-time interval. In certain examples, the adjustable current source 210 can be adjusted to charge the timing capacitor 211 at a rate configured to produce a particular on-time interval duration.

It can be desirable for a comparator of an on-time generator to be very fast to provide accurate on-time intervals. Fast comparators can result in high quiescent current (Iq) for the comparator. For devices using a limited energy supply, such as a battery, fast comparators can reduce the charge life of the battery and thus the charge interval of the device incorporating a boost converter. To achieve a lower averge quiescent current, fast camparotors can be disabled during the off time interval. However, turning the comparator on only during the on-time interval can introduce timing errors as the comparators can require a certain minimum start-up time before being able to provide a valid output.

The present inventors have recognized, among other things, an enhanced on-time delay generator, for example, for a computed on-time boost topology. In certain examples, the enhanced on-time generator can use a fast comparator, can disable the fast comparator during an off-time interval to conserve energy, and can compensate for start-up delays of the fast comparator. In certain examples, the enhanced on-time generator can provide substantially zero quiescent current before and after the on-time interval. Using the techniques of this disclosure, an enhanced on-time generator can be disabled between on-time intervals without significant error in on-time calculations. In addition, the techniques of this disclosure can improve the on-time interval accuracy over broad ranges of input and output voltage combinations.

Figure 3:
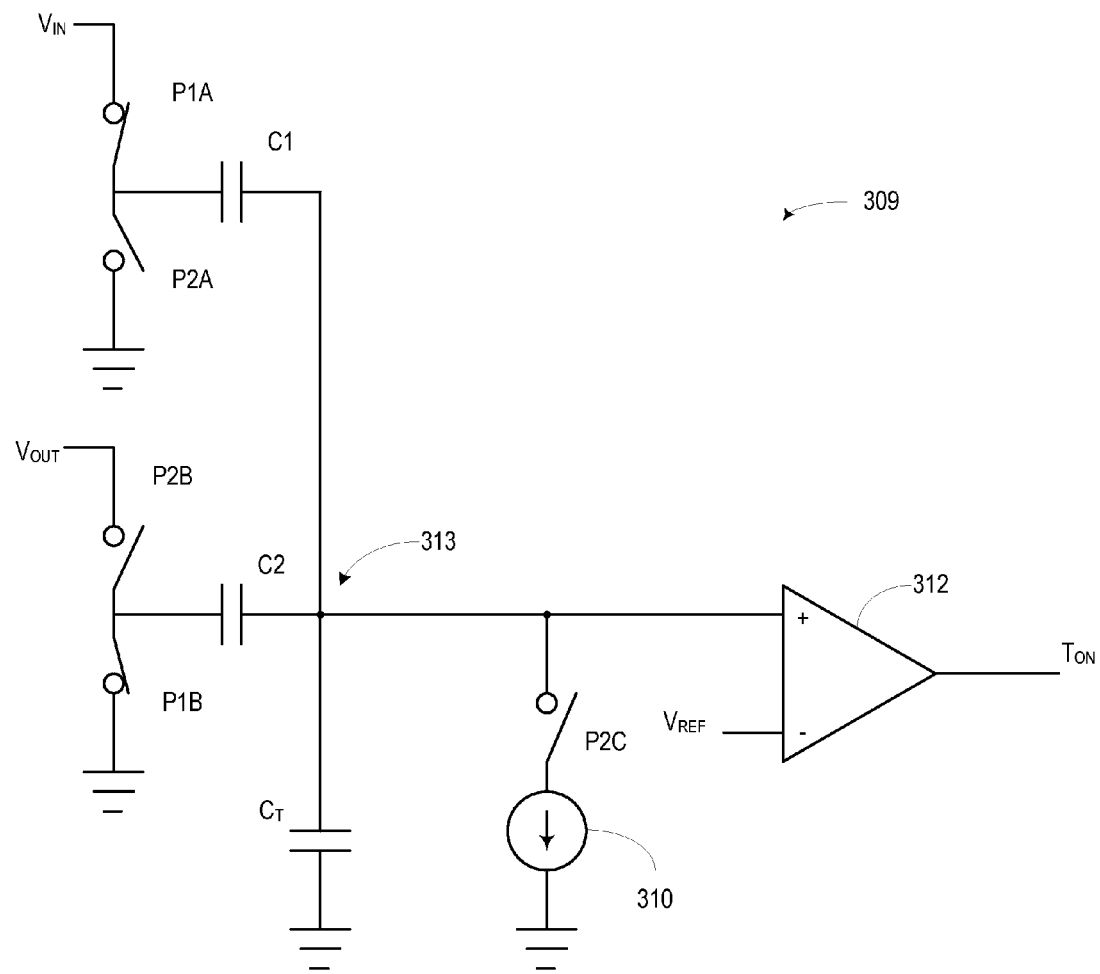
FIG. 3 illustrates generally an example enhanced on-time generator.

FIG. 3 illustrates generally an example enhanced on-time generator 309. In certain examples, the enhanced on-time generator 309 can include a timing capacitor ($C_T$), a current source 310, a comparator 312, first and second compensation capacitors ($C_{IN}$, $C_{OUT}$), and a plurality of phase switches (P1A, P1B, P2A, P2B, P2C). Using the techniques of this disclosure, the enhanced on-time generator 309 can cancel out start-up delay errors associated with enabling the comparator 312 at the beginning of an on-time delay interval. In certain examples, an enhanced on-time generator 309 can require very little additional integrated circuit rea when compared to a topology without enhancements.

In certain examples, the enhanced on-time generator 309 can discharge the timing capacitor ($C_T$) using the current source 310 to accurately provide an indication of the end of an on-time interval. In certain examples, the indication can be manifested by a transition of an output of a fast comparator 312. The fast comparator 312 can compare the voltage across the timing capacitor ($C_T$) to a threshold or reference voltage ($V_{REF}$) and provide an output indicative of the comparison. When the voltage across the timing capacitor ($C_T$) discharges below or becomes less than the reference voltage ($V_{REF}$), the comparator 312 can change the logic level of the output of the comparator 312 to indicate the end of an on-time interval ($T_{ON}$). In certain examples, the enhanced on-time generator 309, or components such as the comparator 312, can be disabled outside of the on-time interval ($T_{ON}$) to conserve energy. It is generally known that upon initiating a comparator, the comparator can require a certain amount of time (e.g. minimum on-time) to start up before providing a valid output based on a comparison of inputs to the comparator.

In certain examples, the enhanced on-time generator 309 can include compensation circuitry for compensating for the minimum on-time such that after the minimum on-time, the enhanced on-time generator 309 can accurately indicate the end of the on-time interval ($T_{ON}$). In some examples, an output signal of the enhanced on-time generator 309 can be used with a transistor to terminate an on-time interval of a voltage converter. In certain examples, the compensation circuitry can include the first and second compensation capacitors (C1, C2), and the plurality of phase switches (P1A, P1B, P2A, P2B, P2C). In an example, a first phase of the on-time interval can pre-charge the first and second compensation capacitors (C1, C2), and a second phase of the on-time interval can allow the first and second compensation capacitors (C1, C2) to bias the timing capacitor ($C_T$) to compensate for the start-up of the comparator 312. The plurality of phase switches (P1A, P1B, P2A, P2B, P2C) can include phase 1 switches (P1x), and phase 2 switches (P2x). Upon initialization of an on-time interval, a controller (not shown), or control logic, can open the phase 2 switches (P2x) and can close the phase 1 switches (P1x). A first phase 1 switch (P1A) can couple the first compensation capacitor (C1) to the input voltage ($V_{IN}$). A second phase 1 switch (P1B) can couple the second compensation capacitor (C2) to ground. In certain examples, a third phase 1 switch, such as a logic gate (not shown), can set the output of the comparator 312 to a proper logic level at least the beginning of the on-time interval ($T_{ON}$). In certain examples, the current source 310 can be enabled at the beginning of the on-time interval ($T_{ON}$) but isolated from the timing capacitor ($C_T$) using a third phase 2 switch (P2C).

At the conclusion of the minimum on-time, or first phase of the on-time interval ($T_{ON}$), the controller can open the phase 1 switches (P1x) and close the phase 2 switches (P2x) to proceed with a second phase of the on-time interval ($T_{ON}$). In certain examples, during the second phase, a first phase 2 switch (P2A) can couple the first compensation capacitor (C1) to ground and a second phase 2 switch (P2B) can couple the second compensation capacitor (C2) to the output voltage ($V_{OUT}$). In combination with the pre-charge of the compensation capacitors (C1, C2) during the first phase, the configuration of the compensation capacitors (C1, C2) during second phase can provide a ($V_{OUT}-V_{IN}$) function such that for C1=C2 the enhanced on-time generator 309 can time out an ideal on-time ($T_I$) of, $$T_I = \frac{(V_{OUT} - V_{IN}) * C_1}{A * V_{OUT}},$$

where A is a scale value associated with the current source 310.

However, taking into consideration the minimum on-time for the comparator 312 to start-up, with C1=C2, the actual on-time ($T_{ON}$) is given as, $$T_{ON} = \frac{(V_{OUT} - V_{IN}) * C_1}{A * V_{OUT}} + T_{P1},$$

where A is the scale value associated with the current source and $T_{P1}$ is the interval of the first phase or the minimum on-time. Thus, with C1=C2 the enhanced on-time generator 309 can include a timing error associated with the start-up of the comparator 312.

The inventors have recognized, however, that if the first and second compensation capacitors (C1, C2) are of different size or capacitance (e.g., C1≠C2), the actual on-time ($T_{ON}$) can be given as, $$T_{ON} = \frac{(V_{OUT} - V_{IN}) * C_1}{A * V_{OUT}} - \frac{C1 - C2}{A} + T_{P1}.$$

In certain examples, since the minimum on-time ($T_{P1}$) required to start the comparator 312 can be measured and can be consistent from start-up to start-up, the size or capacitance of the first compensation capacitor (C1) and the second compensation capacitor (C2) can be selected to cancel out the minimum on-time of the enhanced on-time generator 309 and, thus, provide a more ideal on-time interval ($T_{ON}$) for on-time intervals longer than the minimum on-time ($T_{P1}$).

In certain examples, the first compensation capacitor (C1), the second compensation capacitor (C2), the timing capacitor (CT) and a first input of the comparator 312 can be coupled at a common node 313. In certain examples, the output of the comparator 312, can generate a timing signal to control a transistor of a voltage converter such as the first transistor 107 of the boost converter system 100 of FIG. 1.

Figure 4A:
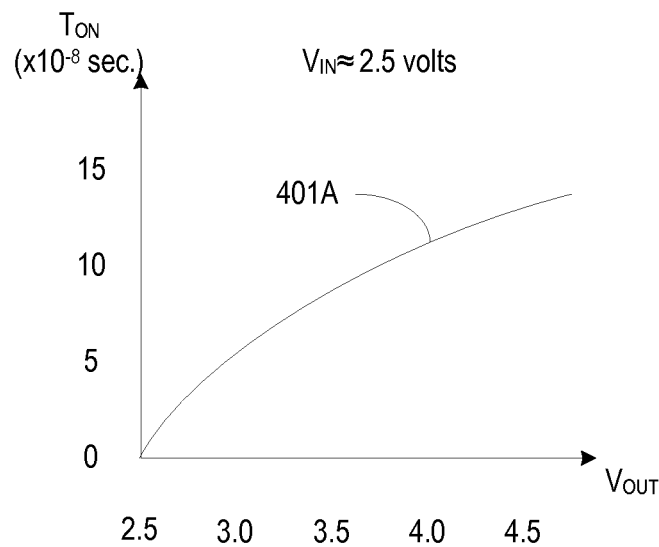
FIG. 4A-4C graphically illustrates improved timing provided by an example enhanced on-time generator compared to an existing on-time generator.
Figure 4B:
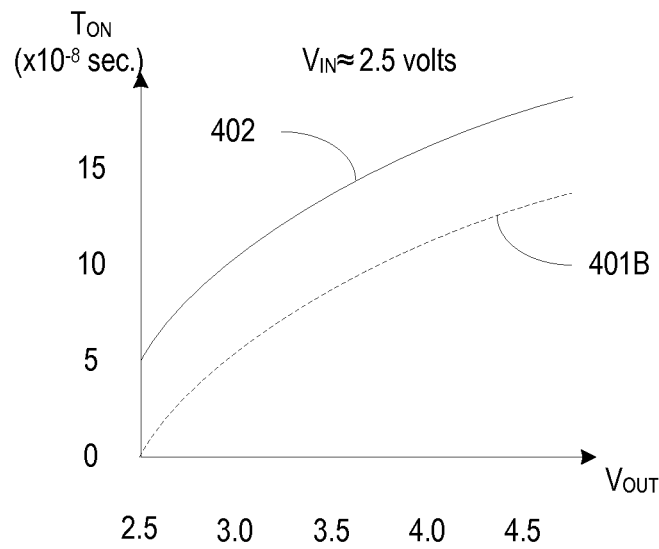
Figure 4C:
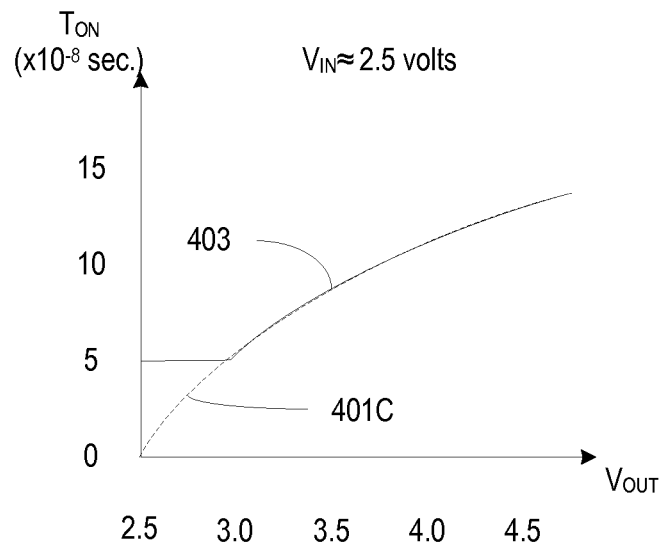

FIG. 4A-4C graphically illustrates the improved timing provided by an example enhanced on-time generator. FIG. 4A illustrates the ideal on-time curve 401A to provide the corresponding output voltage when the input voltage is about 2.5 volts. FIG. 4B illustrates the actual on-time curve 402 generated for an output voltage according to the topology illustrated in FIG. 2 when power is isolated from the comparator outside of an on-time interval of the on-time generator and when the input voltage is about 2.5 volts. The ideal on-time curve 401B is shown as a dashed line also. FIG. 4C illustrates the actual on-time curve 403 generated for an output voltage according to the topology of the enhanced on-time generator as illustrated in FIG. 3 when power is isolated from the comparator outside of an on-time interval of the enhanced on-time generator, and when the input voltage is about 2.5 volts. The ideal on-time curve 401C is shown as a dashed line also.

For each output value illustrated in FIG. 4B, the non-enhanced on-time generator produces an on-time interval that is longer than the ideal on-time interval. The extended length is due to the uncompensated start-up delay of the comparator. For each output value illustrated in FIG. 4C above about 3 volts, the on-time provide by the enhanced on-time generator substantially matches the ideal on-time resulting in a better regulated converter output with less ripple than the non-enhance on-time generator while also providing a lower quiescent current to operate the converter.

Additional Notes

In Example 1, an on-time generator configured to provide a timing signal to terminate an on-time interval of a voltage converter, wherein the on-time interval is associated with a low-impedance mode of a transistor of the voltage converter can include a timing capacitor configured to provide a timing voltage, a comparator configured to receive the timing voltage to a threshold voltage and to provide the timing signal using a comparison of the timing voltage and the threshold voltage, the comparator configured to be disabled outside of the on-time interval and having a start-up delay prior to comparing the timing voltage and the threshold voltage, a current source configured to discharge the timing voltage of the timing capacitor after the start-up delay, and first and second compensation capacitors configured to bias the timing voltage of the timing capacitor to compensate for the start-up delay, wherein the size of the first compensation capacitor is different than the size of the second compensation capacitor.

In Example 2, a first node of the first compensation capacitor, a first node of the second compensation capacitor, and a first node of the timing capacitor of Example 1 optionally are coupled together with a first input of the comparator.

In Example 3, the on-time generator of any one or more of Examples 1-2 optionally includes a first switch configured to couple a second node of the first compensation capacitor with an input voltage of the voltage converter during the start-up delay.

In Example 4, the on-time generator of any one or more of Examples 1-3 optionally includes a second switch configured to couple a second node of the second compensation capacitor to ground during the start-up delay.

In Example 5, the on-time generator of any one or more of Examples 1-4 optionally includes a third switch configured to isolate the current source from the first node of the comparator during the start-up delay.

In Example 6, the on-time generator of any one or more of Examples 1-5 optionally includes a first switch configured to couple a second node of the first compensation capacitor with ground after the start-up delay.

In Example 7, the on-time generator of any one or more of Examples 1-6 optionally includes a second switch configured to couple a second node of the second compensation capacitor to an output voltage of the voltage controller after the start-up delay.

In Example 8, the on-time generator of any one or more of Examples 1-7 optionally includes a third switch configured to couple the current source to the first node of the comparator after the start-up delay.

In Example 9, a method of generating a signal indicative of an end of an on-time interval of a voltage converter, wherein the on-time interval is associated with a low-impedance mode of a transistor of the voltage converter, can include initiating a start-up delay of a comparator at a beginning of the on-time interval, receiving a timing voltage from a timing capacitor coupled to a first input of the comparator, receiving a threshold voltage at a second input of the comparator, pre-charging the timing capacitor and first and second compensation capacitors during the start-up delay, biasing the timing capacitor after the start-up delay to compensate for the start-up delay using the first and second compensation capacitors, discharging the timing capacitor after the start-up delay, comparing the timing voltage and the threshold voltage, and generating a transition of the signal as the timing voltage becomes less than the threshold to indicate an end of the on-time interval.

In Example 10, the method of any one or more of Examples 1-9 optionally includes disabling the comparator after the end of the on-time interval to conserve energy.

In Example 11, receiving the timing voltage of any one or more of Examples 1-10 optionally includes coupling together a first node of the first compensation capacitor, a first node of the second compensation capacitor, a first node of the timing capacitor and the first node of the comparator.

In Example 12, the pre-charging of any one or more of Examples 1-11 optionally includes coupling a first node of the first compensation capacitor to an input voltage of the voltage converter using a first switch.

In Example 13, the pre-charging of any one or more of Examples 1-12 optionally includes coupling a first node of the second compensation capacitor to ground using a second switch.

In Example 14, the pre-charging of any one or more of Examples 1-13 optionally includes isolating the current source from the first node of the timing capacitor using a third switch.

In Example 15, receiving the timing voltage of any one or more of Examples 1-14 optionally includes coupling together a first node of the first compensation capacitor, a first node of the second compensation capacitor, a first node of the timing capacitor and the first node of the comparator.

In Example 16, the biasing the timing capacitor of any one or more of Examples 1-15 optionally includes coupling the second node of the first compensation capacitor to ground using a first switch.

In Example 17, the biasing the timing capacitor of any one or more of Examples 1-16 optionally includes coupling the second node of the second compensation capacitor to an output voltage of the voltage converter using a second switch.

In Example 18, the pre-charging of any one or more of Examples 1-17 optionally includes coupling the current source to the first node of the timing capacitor using a third switch.

In Example 19, receiving the timing voltage of any one or more of Examples 1-18 optionally includes coupling together a first node of the first compensation capacitor, a first node of the second compensation capacitor, a first node of the timing capacitor and the first node of the comparator.

In Example 20, a voltage converter can include a first transistor configured to increase current through an inductor during an on-time interval of the first transistor, and an on-time generator configured to provide a timing signal to terminate the on-time interval. In certain examples, the on-time generator can include a timing capacitor configured to provide a timing voltage, a comparator configured to be disabled outside of the on-time interval to save power, to receive the timing voltage and a threshold voltage, and to provide the timing signal when the voltage of the timing capacitor becomes less than the threshold, the comparator having a start-up delay prior to providing an output indicative of a comparison of the timing voltage and the threshold, a current source configured to discharge the timing voltage of the timing capacitor after the startup delay, first and second compensation capacitors configured to bias the timing voltage of the timing capacitor to compensate for the start-up delay, wherein the size of the first compensation capacitor is different than the size of the second compensation capacitor, wherein a first node of the first compensation capacitor, a first node of the second compensation capacitor, and a first node of the timing capacitor are coupled together with a first input of the comparator, a first switch configured to couple a second node of the first compensation capacitor with an input voltage of the voltage converter during the start-up delay, a second switch configured to couple a second node of the second compensation capacitor to ground during the start-up delay, a third switch configured to isolate the current source from the first node of the comparator during the start-up delay, a fourth switch configured to couple a second node of the first compensation capacitor with ground after the start-up delay, a fifth switch configured to couple a second node of the second compensation capacitor to an output voltage of the voltage controller after the start-up delay, and a sixth switch configured to couple the current source to the first node of the comparator after the start-up delay.

In Example 21, the voltage converter of any one or more of Examples 1-20 optionally includes a second transistor configured to couple the inductor to an output of the voltage converter during an off-time interval of the first transistor.

Example 22 can include, or can optionally be combined with any portion or combination of any portions of any one or more of Examples 1 through 21 to include, subject matter that can include means for performing any one or more of the functions of Examples 1 through 21, or a machine-readable medium including instructions that, when performed by a machine, cause the machine to perform any one or more of the functions of Examples 1 through 21.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An on-time generator configured to provide a timing signal to terminate an on-time interval of a voltage converter, wherein the on-time interval is associated with a low-impedance mode of a transistor of the voltage converter, the on-time generator comprising:
    a timing capacitor configured to provide a timing voltage;
    a comparator configured to compare the timing voltage to a threshold voltage and to provide the timing signal using a comparison of the timing voltage and the threshold voltage, the comparator configured to be disabled outside of the on-time interval and having a start-up delay prior to comparing the timing voltage and the threshold voltage;
    a current source configured to discharge the timing voltage of the timing capacitor after the start-up delay;
    first and second compensation capacitors configured to bias the timing voltage of the timing capacitor to compensate for the start-up delay, wherein the size of the first compensation capacitor is different than the size of the second compensation capacitor;
    a first switch configured to couple a second node of the first compensation capacitor with an input voltage of the voltage converter during the start-up delay; and
    wherein a first node of the first compensation capacitor, a first node of the second compensation capacitor, and a first node of the timing capacitor are coupled together with a first input of the comparator.

2. The on-time generator of claim 1, including a second switch configured to couple a second node of the second compensation capacitor to ground during the start-up delay.

3. The on-time generator of claim 2, including a third switch configured to isolate the current source from the first node of the comparator during the start-up delay.

4. The on-time generator of claim 1, including a first switch configured to couple a second node of the first compensation capacitor with ground after the start-up delay.

5. The on-time generator of claim 4, including a second switch configured to couple a second node of the second compensation capacitor to an output voltage of the voltage controller after the start-up delay.

6. The on-time generator of claim 5, including a third switch configured to couple the current source to the first node of the comparator after the start-up delay.

7. A method of generating a signal indicative of an end of an on-time interval of a voltage converter, wherein the on-time interval is associated with a low-impedance mode of a transistor of the voltage converter, the method comprising;
    initiating a start-up delay of a comparator at a beginning of the on-time interval;
    receiving a timing voltage from a timing capacitor coupled to a first input of the comparator;
    receiving a threshold voltage at a second input of the comparator;
    pre-charging the timing capacitor and first and second compensation capacitors during the start-up delay;
    biasing the timing capacitor after the start-up delay to compensate for the start-up delay using the first and second compensation capacitors;
    discharging the timing capacitor after the start-up delay;
    comparing the timing voltage and the threshold voltage; and
    generating a transition of the signal as the timing voltage becomes less than the threshold to indicate an end of the on-time interval;
    wherein the biasing the timing capacitor includes coupling the second node of the second compensation capacitor to an output voltage of the voltage converter using a second switch.

8. The method of claim 7, including disabling the comparator after the end of the on-time interval to conserve energy.

9. The method of claim 7, wherein receiving the timing voltage includes coupling together a first node of the first compensation capacitor, a first node of the second compensation capacitor, a first node of the timing capacitor and the first node of the comparator.

10. The method of claim 7, wherein the pre-charging includes coupling a first node of the first compensation capacitor to an input voltage of the voltage converter using a first switch.

11. The method of claim 10, wherein the pre-charging includes coupling a second node of the second compensation capacitor to ground using a second switch.

12. The method of claim 11, wherein the pre-charging includes isolating the current source from the first node of the timing capacitor using a third switch.

13. The method of claim 12, wherein receiving the timing voltage includes coupling together a first node of the first compensation capacitor, a first node of the second compensation capacitor, a first node of the timing capacitor and the first node of the comparator.

14. The method of claim 7, wherein the biasing the timing capacitor includes coupling the second node of the first compensation capacitor to ground using a first switch.

15. The method of claim 7, wherein the pre-charging includes coupling the current source to the first node of the timing capacitor using a third switch.

16. The method of claim 15, wherein receiving the timing voltage includes coupling together a first node of the first compensation capacitor, a first node of the second compensation capacitor, a first node of the timing capacitor and the first node of the comparator.

17. A voltage converter comprising;
    a first transistor configured to increase current through an inductor during an on-time interval of the first transistor;
    an on-time generator configured to provide a timing signal to terminate the on-time interval, the on-time generator comprising:
        a timing capacitor configured to provide a timing voltage;
        a comparator configured to be disabled outside of the on-time interval to save power, to receive the timing voltage and a threshold voltage, and to provide the timing signal when the voltage of the timing capacitor becomes less than the threshold, the comparator having a start-up delay prior to providing an output indicative of a comparison of the timing voltage and the threshold;
        a current source configured to discharge the timing voltage of the timing capacitor after the startup delay;
        first and second compensation capacitors configured to bias the timing voltage of the timing capacitor to compensate for the start-up delay, wherein the size of the first compensation capacitor is different than the size of the second compensation capacitor, wherein a first node of the first compensation capacitor, a first node of the second compensation capacitor, and a first node of the timing capacitor are coupled together with a first input of the comparator;
        a first switch configured to couple a second node of the first compensation capacitor with an input voltage of the voltage converter during the start-up delay;
        a second switch configured to couple a second node of the second compensation capacitor to ground during the start-up delay;
        a third switch configured to isolate the current source from the first node of the comparator during the start-up delay;
        a fourth switch configured to couple a second node of the first compensation capacitor with ground after the start-up delay;
        a fifth switch configured to couple a second node of the second compensation capacitor to an output voltage of the voltage controller after the start-up delay; and
        a sixth switch configured to couple the current source to the first node of the comparator after the start-up delay.

18. The voltage converter of claim 17, including a second transistor configured to couple the inductor to an output of the voltage converter during an off-time interval of the first transistor.

* * * * *

UNITED STATES PATENT AND TRADEMARK OFFICE
CERTIFICATE OF CORRECTION

PATENT NO. : 9,069,364 B2
APPLICATION NO. : 13/826543
DATED : June 30, 2015
INVENTOR(S) : Juha-Matti Kujala et al.

It is certified that error appears in the above-identified patent and that said Letters Patent is hereby corrected as shown below:

Claims

In column 8, line 65, in Claim 4, delete "first" and insert --second--, therefor In column 9, line 1, in Claim 5, delete "second" and insert --third--, therefor In column 9, line 5, in Claim 6, delete "third" and insert --fourth--, therefor In column 9, line 32, in Claim 7, delete "second" and insert --first--, therefor In column 9, line 44, in Claim 10, delete "first" and insert --second--, therefor In column 9, line 47, in Claim 11, delete "second" and insert --third--, therefor In column 9, line 50, in Claim 12, delete "third" and insert --fourth--, therefor In column 9, line 58, in Claim 14, delete "first" and insert --second--, therefor In column 10, line 3, in Claim 15, delete "third" and insert --second--, therefor Signed and Sealed this
Sixteenth Day of February, 2016

Michelle K. Lee
*Director of the United States Patent and Trademark Office*